(12) United States Patent
Nie

(10) Patent No.: US 11,771,263 B2
(45) Date of Patent: Oct. 3, 2023

(54) TOASTER

(71) Applicant: JIANGMEN CITY XINHUI HENGLONG INNOVATIVE HOUSEWARES CO., LTD., Jiangmen (CN)

(72) Inventor: Huayao Nie, Jiangmen (CN)

(73) Assignee: JIANGMEN CITY XINHUI HENGLONG INNOVATIVE HOUSEWARES CO., LTD., Jiangmen (CN)

( * ) Notice: Subject to any disclaimer, the term of this patent is extended or adjusted under 35 U.S.C. 154(b) by 155 days.

(21) Appl. No.: 17/391,772

(22) Filed: Aug. 2, 2021

(65) Prior Publication Data
US 2022/0395139 A1 Dec. 15, 2022

(30) Foreign Application Priority Data

Jun. 15, 2021 (CN) .......................... 202121322395.9

(51) Int. Cl.
*A47J 37/08* (2006.01)
(52) U.S. Cl.
CPC ..................... *A47J 37/08* (2013.01)
(58) Field of Classification Search
CPC ........................................... A47J 37/08
USPC ........................................................ 219/402
See application file for complete search history.

(56) References Cited

U.S. PATENT DOCUMENTS

| | | | |
|---|---|---|---|
| 1,717,926 A | 6/1929 | Horowitz | |
| 2,279,578 A * | 4/1942 | Martin | A47K 11/023 |
| | | | 219/217 |
| 2,456,291 A | 12/1948 | Malone | |
| 2,778,914 A * | 1/1957 | Vallorani | H05B 1/0208 |
| | | | 219/412 |
| 3,154,004 A * | 10/1964 | Huck | A47J 37/0807 |
| | | | 99/337 |
| 3,257,544 A * | 6/1966 | Benjamin, Jr. | H05B 1/0244 |
| | | | 219/486 |

(Continued)

FOREIGN PATENT DOCUMENTS

| CN | 104797148 A * | 7/2015 | ............ A47J 37/08 |
|---|---|---|---|
| DE | 1654919 A1 | 3/1971 | |

(Continued)

OTHER PUBLICATIONS

Search report in European application No. EP 21184718, dated Dec. 10, 2021, 2 pages.

(Continued)

*Primary Examiner* — Jimmy Chou
(74) *Attorney, Agent, or Firm* — Whiteford, Taylor & Preston, LLP; Peter J. Davis

(57) ABSTRACT

Disclosed is a toaster, including a box body, a feeding bin, a conveying device, a first heating device and a second heating device. One side of the box body is provided with a discharging port; the feeding bin is provided with a feeding port in communication with an inner cavity of the box body. The conveying device is arranged between the feeding port and the discharging port, and is configured to convey foodstuffs from the feeding port to the discharging port. The first heating device is configured to heat foodstuffs on the conveying device, and the second heating device is configured to preheat the foodstuffs within the feeding bin.

16 Claims, 4 Drawing Sheets

(56) References Cited

U.S. PATENT DOCUMENTS

| | | | | | |
|---|---|---|---|---|---|
| 3,736,860 | A | * | 6/1973 | Vischer, Jr. | F24C 7/087 99/477 |
| 4,065,659 | A | * | 12/1977 | Yount | F24C 7/087 219/397 |
| 4,176,589 | A | * | 12/1979 | Stuck | A47J 37/044 99/443 C |
| 4,238,670 | A | * | 12/1980 | Maitenaz | G05D 23/1904 219/486 |
| 4,281,594 | A | * | 8/1981 | Baker | A47J 37/044 99/401 |
| 4,286,509 | A | * | 9/1981 | Miller | A47J 37/0857 99/332 |
| 4,302,661 | A | * | 11/1981 | Perry, Jr. | F24C 14/00 219/398 |
| 4,337,893 | A | * | 7/1982 | Flanders | F24D 19/1009 236/1 EB |
| 4,377,109 | A | * | 3/1983 | Brown | A21B 1/245 219/400 |
| 4,389,562 | A | * | 6/1983 | Chaudoir | A21B 1/48 219/400 |
| 4,438,572 | A | * | 3/1984 | Kaminski | A21B 1/26 99/447 |
| 4,462,383 | A | * | 7/1984 | Henke | A21B 1/245 219/400 |
| 4,471,750 | A | * | 9/1984 | Burtea | A21B 1/245 99/477 |
| 4,474,498 | A | * | 10/1984 | Smith | A21B 1/245 219/400 |
| 4,479,776 | A | * | 10/1984 | Smith | A23L 3/185 219/400 |
| 4,492,839 | A | * | 1/1985 | Smith | A23L 5/17 219/699 |
| 4,538,049 | A | * | 8/1985 | Ryckman, Jr. | A47J 37/0635 219/397 |
| 4,554,437 | A | * | 11/1985 | Wagner | F27B 9/021 392/416 |
| 4,556,043 | A | * | 12/1985 | Bratton | A21B 1/48 219/400 |
| 4,576,090 | A | * | 3/1986 | Burtea | A21B 1/245 219/400 |
| 4,591,333 | A | * | 5/1986 | Henke | A21B 1/48 219/400 |
| 4,626,661 | A | * | 12/1986 | Henke | F27D 7/04 219/400 |
| 4,679,542 | A | * | 7/1987 | Smith | A21B 1/245 99/447 |
| 4,701,340 | A | * | 10/1987 | Bratton | A21B 1/245 426/511 |
| 4,719,332 | A | * | 1/1988 | Markuson, Jr. | F27B 9/243 219/400 |
| 4,749,581 | A | * | 6/1988 | Gorsuch | A47J 27/022 426/523 |
| 4,753,215 | A | * | 6/1988 | Kaminski | A21B 1/26 34/223 |
| 4,757,800 | A | * | 7/1988 | Shei | A21B 1/245 34/223 |
| 4,772,779 | A | * | 9/1988 | Scheidler | H05B 3/748 219/448.11 |
| 4,781,169 | A | * | 11/1988 | Henke | A47J 37/045 99/477 |
| 4,831,237 | A | * | 5/1989 | Gelineau | F24C 14/02 126/21 R |
| 4,834,063 | A | * | 5/1989 | Hwang | A21B 3/04 126/41 R |
| 4,873,107 | A | * | 10/1989 | Archer | A21B 1/48 426/523 |
| 4,881,519 | A | * | 11/1989 | Henke | A21B 1/245 99/477 |
| 4,894,517 | A | * | 1/1990 | Oguri | B29C 35/0277 219/405 |
| 4,924,763 | A | * | 5/1990 | Bingham | A47J 37/046 432/142 |
| 4,936,286 | A | * | 6/1990 | Baker | A47J 37/044 126/41 R |
| 4,940,040 | A | * | 7/1990 | Randall | A21B 1/48 126/41 R |
| 4,951,648 | A | * | 8/1990 | Shukla | A21B 1/245 126/21 R |
| 4,960,100 | A | * | 10/1990 | Pellicane | A21B 1/48 126/21 R |
| 4,964,392 | A | * | 10/1990 | Bruno | A21B 1/48 126/21 R |
| 4,965,435 | A | * | 10/1990 | Smith | A23L 3/185 219/400 |
| 5,013,563 | A | * | 5/1991 | Stuck | A47J 37/044 426/523 |
| 5,025,775 | A | * | 6/1991 | Crisp | A21B 1/48 126/21 R |
| 5,066,850 | A | * | 11/1991 | Kondo | B23K 1/008 228/180.1 |
| 5,131,841 | A | * | 7/1992 | Smith | A21B 1/245 432/152 |
| 5,170,039 | A | * | 12/1992 | Eisenberg | A47J 37/08 219/393 |
| 5,180,898 | A | * | 1/1993 | Alden | A47J 37/044 219/400 |
| 5,185,172 | A | * | 2/1993 | Barkhau | A47J 37/045 426/468 |
| 5,197,375 | A | * | 3/1993 | Rosenbrock | G05D 23/22 99/335 |
| 5,205,274 | A | * | 4/1993 | Smith | A21B 1/44 432/142 |
| 5,231,920 | A | * | 8/1993 | Alden | A21B 1/26 99/477 |
| 5,239,917 | A | * | 8/1993 | Lutkie | A21B 1/48 99/443 C |
| 5,253,564 | A | * | 10/1993 | Rosenbrock | A21B 1/48 99/335 |
| 5,276,978 | A | * | 1/1994 | Hopkins | D06C 7/00 34/550 |
| 5,351,416 | A | * | 10/1994 | Witkin | F26B 13/10 34/79 |
| 5,361,749 | A | * | 11/1994 | Smith | F24C 15/006 126/21 R |
| 5,398,666 | A | * | 3/1995 | Smith | A21B 1/245 432/142 |
| 5,401,940 | A | * | 3/1995 | Smith | H05B 6/6476 219/679 |
| 5,423,248 | A | * | 6/1995 | Smith | A21B 1/245 219/400 |
| 5,433,368 | A | * | 7/1995 | Spigarelli | B23K 1/012 219/390 |
| 5,454,295 | A | * | 10/1995 | Cox | A21B 1/48 99/332 |
| 5,584,237 | A | * | 12/1996 | Moshonas | A21B 1/245 219/400 |
| 5,588,354 | A | * | 12/1996 | Stuck | A47J 37/044 99/477 |
| 5,640,896 | A | * | 6/1997 | Stuck | A47J 37/0713 126/41 R |
| 5,655,511 | A | * | 8/1997 | Prabhu | F24C 15/322 126/21 R |
| 5,671,660 | A | * | 9/1997 | Moshonas | A21B 1/245 219/400 |
| 5,673,610 | A | * | 10/1997 | Stuck | A47J 37/0864 99/393 |
| 5,676,044 | A | * | 10/1997 | Lara, Jr. | A21B 1/245 219/400 |
| 5,717,192 | A | * | 2/1998 | Dobie | H05B 6/808 219/400 |
| 5,727,451 | A | * | 3/1998 | DeMars | A47J 37/044 99/446 |
| 5,746,116 | A | * | 5/1998 | Smith | A47J 37/08 219/400 |
| 5,818,014 | A | * | 10/1998 | Smith | H05B 6/6408 219/679 |
| 5,821,503 | A | * | 10/1998 | Witt | F27B 9/40 219/509 |

(56) References Cited

U.S. PATENT DOCUMENTS

| | | | | |
|---|---|---|---|---|
| 5,832,812 A * | 11/1998 | Wolfe | A47J 37/044 99/476 |
| 5,964,044 A * | 10/1999 | Lauersdorf | A21B 1/245 34/224 |
| 6,016,935 A * | 1/2000 | Huegerich | B67D 1/10 222/146.1 |
| 6,051,818 A * | 4/2000 | Van Der Wal | A47J 37/08 219/486 |
| 6,080,972 A * | 6/2000 | May | A21B 1/02 219/486 |
| 6,131,559 A * | 10/2000 | Norris | F24C 15/006 55/440 |
| 6,133,549 A * | 10/2000 | Shih | C21D 9/02 34/167 |
| 6,146,677 A * | 11/2000 | Moreth | A21B 1/44 426/523 |
| 6,157,002 A * | 12/2000 | Schjerven, Sr. | A21B 2/00 219/494 |
| 6,201,218 B1 * | 3/2001 | Chandler | A47J 37/0857 198/860.5 |
| 6,205,910 B1 * | 3/2001 | Vaughn | A47J 37/08 219/521 |
| 6,223,650 B1 * | 5/2001 | Stuck | A47J 37/0857 99/393 |
| 6,252,201 B1 * | 6/2001 | Nevarez | A21B 1/48 219/400 |
| 6,320,165 B1 * | 11/2001 | Ovadia | A21B 1/245 219/400 |
| 6,350,972 B1 * | 2/2002 | Wright | A47J 36/2494 126/246 |
| 6,386,095 B1 * | 5/2002 | Ausaf | A47J 37/044 99/421 H |
| 6,389,960 B1 * | 5/2002 | Williams | A47J 37/0713 126/41 R |
| 6,435,866 B1 * | 8/2002 | Ghosh | B23K 1/008 219/486 |
| 6,462,319 B1 * | 10/2002 | Uy | H05B 6/6405 219/400 |
| 6,495,182 B1 * | 12/2002 | Stuck | B65G 59/068 426/523 |
| 6,501,051 B1 * | 12/2002 | Richert | H01L 21/6776 228/180.1 |
| 6,526,961 B1 * | 3/2003 | Hardenburger | A21B 1/245 99/443 C |
| 6,539,934 B2 * | 4/2003 | Moshonas | A21B 1/48 126/21 R |
| 6,572,911 B1 * | 6/2003 | Corcoran | A21B 1/245 99/476 |
| 6,576,874 B2 * | 6/2003 | Zapata | A21B 1/245 219/403 |
| 6,592,364 B2 * | 7/2003 | Zapata | F27B 9/10 99/443 C |
| 6,595,117 B1 * | 7/2003 | Jones | A21B 1/245 99/477 |
| 6,624,396 B2 * | 9/2003 | Witt | A21B 1/42 99/332 |
| 6,638,553 B2 * | 10/2003 | Bell | A21C 9/085 426/523 |
| 6,655,373 B1 * | 12/2003 | Wiker | F23D 14/84 126/21 R |
| 6,684,657 B1 * | 2/2004 | Dougherty | B62B 3/006 165/918 |
| 6,684,875 B1 * | 2/2004 | Schjerven, Sr. | A21B 1/245 126/116 A |
| 6,718,965 B2 * | 4/2004 | Rummel | F24C 15/322 126/21 R |
| 6,723,961 B2 * | 4/2004 | Choat | H05B 6/6476 219/400 |
| 6,817,283 B2 * | 11/2004 | Jones | A47J 37/0857 99/443 C |
| 6,833,533 B1 * | 12/2004 | Wolfe | A21B 1/245 219/400 |
| 6,880,545 B2 * | 4/2005 | Heber | A21B 1/245 219/400 |
| 6,933,473 B2 * | 8/2005 | Henke | A21B 1/48 219/400 |
| 6,936,793 B1 * | 8/2005 | Shiloh | F27B 9/3005 219/394 |
| 7,007,807 B1 * | 3/2006 | Stockard | A21B 1/48 209/592 |
| 7,026,579 B2 * | 4/2006 | Burtea | A21B 1/48 99/443 C |
| 7,038,172 B1 * | 5/2006 | Stuck | A47J 37/044 374/149 |
| 7,059,317 B2 * | 6/2006 | Kobayashi | A47J 37/044 126/21 A |
| 7,091,452 B2 * | 8/2006 | Kingdon | A21B 1/48 426/523 |
| 7,258,881 B2 * | 8/2007 | Jones | A21B 1/245 99/476 |
| 7,285,755 B1 * | 10/2007 | Kingdon | A47J 37/0857 99/386 |
| 7,297,903 B1 * | 11/2007 | March | A47J 37/0857 219/400 |
| 7,307,243 B2 * | 12/2007 | Farkas | A21B 1/48 426/243 |
| 7,335,859 B2 * | 2/2008 | Nevarez | A47J 37/0857 219/386 |
| 7,340,992 B1 * | 3/2008 | Wolfe | A47J 37/045 99/443 C |
| 7,361,303 B2 * | 4/2008 | Kantor | A61L 11/00 422/186.04 |
| 7,541,559 B2 * | 6/2009 | Milz | A21B 1/245 219/494 |
| 7,624,728 B1 * | 12/2009 | Forbes | A21B 1/245 426/477 |
| 7,800,023 B2 * | 9/2010 | Burtea | A21B 1/02 126/92 AC |
| 7,851,727 B2 * | 12/2010 | Burtea | A21B 2/00 126/92 AC |
| 8,087,407 B2 * | 1/2012 | Wiker | A21B 1/40 99/336 |
| 8,093,533 B2 * | 1/2012 | French | A21B 1/245 219/394 |
| 8,113,190 B2 * | 2/2012 | Dougherty | A21B 1/48 219/684 |
| 8,294,070 B2 * | 10/2012 | McNamee | F24C 15/325 219/684 |
| 8,536,493 B1 * | 9/2013 | Wolfe | A21B 1/245 219/400 |
| 8,637,792 B2 * | 1/2014 | Agnello | A21B 1/48 219/400 |
| 8,642,928 B2 * | 2/2014 | Schulte | H05B 6/6485 219/400 |
| 8,748,783 B2 * | 6/2014 | Hensel | A47J 37/0807 219/486 |
| 8,776,773 B1 * | 7/2014 | Wolfe | A21B 1/245 126/21 R |
| 8,839,714 B2 * | 9/2014 | Schjerven, Sr. | A47J 37/045 99/476 |
| 8,869,684 B2 * | 10/2014 | Ajmera | A21B 1/48 99/443 R |
| 9,089,142 B2 * | 7/2015 | Henke | A21B 1/245 |
| 9,149,154 B1 * | 10/2015 | Stuck | A47J 39/003 |
| 9,320,284 B2 * | 4/2016 | Van Camp | A21B 1/245 |
| 9,585,400 B2 * | 3/2017 | Wiker | A21B 1/40 |
| 9,609,981 B2 * | 4/2017 | Schjerven, Sr. | A47J 37/045 |
| 9,924,832 B2 * | 3/2018 | Bauer | A47J 37/0857 |
| 10,024,548 B2 * | 7/2018 | Wiker | F24C 3/122 |
| 11,490,764 B2 * | 11/2022 | Leach | A47J 37/0835 |
| 2001/0022178 A1 * | 9/2001 | Knost | A21B 1/26 432/175 |
| 2001/0030184 A1 * | 10/2001 | Richert | H01L 21/67115 219/413 |
| 2003/0041851 A1 * | 3/2003 | Kingdon | A21B 1/26 126/21 R |
| 2003/0056658 A1 * | 3/2003 | Jones | A47J 37/0857 99/443 C |

(56) References Cited

U.S. PATENT DOCUMENTS

| | | | |
|---|---|---|---|
| 2003/0213371 A1* | 11/2003 | Saunders | A47J 37/0857 99/389 |
| 2004/0016744 A1* | 1/2004 | Ottaway | F24C 7/008 219/399 |
| 2004/0250688 A1* | 12/2004 | Farkas | A21B 1/48 99/386 |
| 2005/0109216 A1* | 5/2005 | Jones | A47J 37/0857 99/386 |
| 2005/0139203 A1* | 6/2005 | Jones | A21B 1/48 99/443 C |
| 2005/0139204 A1* | 6/2005 | Berti | A21B 1/245 126/21 A |
| 2005/0274373 A1* | 12/2005 | Pesonen | F27B 9/3005 126/21 A |
| 2006/0081591 A1* | 4/2006 | Kingdon | A21B 1/48 219/388 |
| 2006/0087136 A1* | 4/2006 | Pearl | A47F 13/08 294/176 |
| 2006/0243721 A1* | 11/2006 | Sorensen | A21B 3/04 219/401 |
| 2007/0006865 A1* | 1/2007 | Wiker | F24C 14/025 126/21 A |
| 2007/0012307 A1* | 1/2007 | Wiker | A21B 1/40 126/21 A |
| 2007/0137633 A1* | 6/2007 | McFadden | H05B 6/6441 126/21 A |
| 2007/0272228 A1* | 11/2007 | Slaby | F24H 3/087 126/99 D |
| 2008/0022993 A1* | 1/2008 | Moretti | A21B 1/245 126/21 A |
| 2008/0067166 A1* | 3/2008 | Yoder | A21B 1/48 219/400 |
| 2008/0087173 A1* | 4/2008 | Milz | A21B 1/245 426/243 |
| 2008/0092754 A1* | 4/2008 | Noman | A21B 1/245 99/443 C |
| 2008/0141868 A1* | 6/2008 | Cook | A47J 37/045 426/233 |
| 2008/0149087 A1* | 6/2008 | Wolfe | A21B 1/26 126/21 A |
| 2008/0182214 A1* | 7/2008 | Cox | F23N 1/045 431/12 |
| 2008/0216812 A1* | 9/2008 | Dougherty | A21B 1/48 99/443 R |
| 2008/0282903 A1* | 11/2008 | Gonzalez | A47J 37/0857 99/334 |
| 2008/0289619 A1* | 11/2008 | Schjerven, Sr. | A47J 37/044 126/41 R |
| 2009/0075224 A1* | 3/2009 | Wiker | A21B 1/48 432/8 |
| 2009/0308860 A1* | 12/2009 | Baccini | H01L 21/67715 219/618 |
| 2010/0058936 A1* | 3/2010 | Schjerven, Sr. | A21B 1/245 432/65 |
| 2010/0104997 A1* | 4/2010 | Wolfe | A21B 1/26 432/152 |
| 2010/0319551 A1* | 12/2010 | Cox | F23N 1/045 431/18 |
| 2011/0020492 A1* | 1/2011 | Ajmera | A21D 13/00 426/549 |
| 2011/0048244 A1* | 3/2011 | Wiker | A21B 1/245 99/443 C |
| 2011/0048245 A1* | 3/2011 | Schjerven, Sr. | A47J 37/044 99/443 C |
| 2011/0210113 A1* | 9/2011 | Lauer | A47J 37/044 219/209 |
| 2011/0210114 A1* | 9/2011 | Lauer | A21B 1/26 454/49 |
| 2011/0269085 A1* | 11/2011 | Wiker | A21B 1/48 219/388 |
| 2011/0277643 A1* | 11/2011 | Schwierking | A47J 36/32 99/331 |
| 2011/0283894 A1* | 11/2011 | Schjerven, Sr. | A21B 1/245 99/443 C |
| 2011/0303100 A1* | 12/2011 | Agnello | A47J 37/0807 165/104.19 |
| 2012/0180775 A1* | 7/2012 | Waltz | A21B 1/245 126/15 R |
| 2013/0000628 A1* | 1/2013 | Wiker | A21B 1/245 99/443 C |
| 2013/0192583 A1* | 8/2013 | Chang | F24C 15/008 126/21 A |
| 2013/0239822 A1* | 9/2013 | McKee | A21B 1/42 99/443 C |
| 2013/0306616 A1* | 11/2013 | Wildebush | A47J 37/0857 219/413 |
| 2014/0037809 A1* | 2/2014 | Middleton, Jr. | A21B 1/48 426/496 |
| 2014/0144331 A1* | 5/2014 | Hensel | A47J 37/0807 99/389 |
| 2014/0199446 A1* | 7/2014 | Huegerich | A47J 37/0857 426/233 |
| 2014/0220197 A1* | 8/2014 | Hocker | G01N 33/12 426/233 |
| 2014/0261371 A1* | 9/2014 | Van Camp | A21B 1/48 99/443 C |
| 2014/0331870 A1* | 11/2014 | Anders | A22C 11/003 99/591 |
| 2014/0361001 A1* | 12/2014 | Day | H01R 13/60 219/428 |
| 2015/0157171 A1* | 6/2015 | Janecka | A47J 37/044 219/400 |
| 2016/0050939 A1* | 2/2016 | Riggle | A21B 1/26 219/400 |
| 2016/0174572 A1* | 6/2016 | Taslagyan | A47J 37/042 99/443 C |
| 2016/0345388 A1* | 11/2016 | Nakamura | H05B 6/6414 |
| 2020/0323389 A1* | 10/2020 | Nie | A47J 37/0807 |

FOREIGN PATENT DOCUMENTS

| | | | |
|---|---|---|---|
| DE | 2804701 A1 * | 8/1978 | A23L 5/10 |
| DE | 2804701 A1 | 8/1978 | |

OTHER PUBLICATIONS

Office action in European application No. EP 21184718, dated Jan. 21, 2022, 4 pages.

\* cited by examiner

TOASTER

CROSS-REFERENCE TO RELATED APPLICATIONS

This application claims the benefit of priority of Chinese patent application No. 202121322395.9, filed Jun. 15, 2021, and titled "Toaster," which is incorporated by reference herein in its entirety.

FIELD OF THE INVENTION

The present invention generally relates to the field of food heating equipment. In particular, the present invention is directed to a toaster.

BACKGROUND

A toaster is a cooking utensil used to toast and heat sliced bread and other foodstuffs. When a toaster currently available on the market toasts bread and other foodstuffs, the foodstuffs can only be heated and toasted in a heating section, with the result that a relatively long heating time is required for the foodstuffs in the heating section. This reduces the heating efficiency of the toaster, so that a user needs to wait for a comparatively long time, and the user experience is negatively affected.

SUMMARY OF THE DISCLOSURE

In an aspect a toaster includes a box body, wherein the box body has an inner cavity and the box body includes a discharging port on one side of the box body. The toaster includes a feeding bin having a feeding end that extends into the box body, wherein the feeding bin further comprises a feeding port in communication with an inner cavity of the box body and the feeding bin includes a further end provided with a material inlet. The toaster includes a conveying device arranged between the feeding port and the discharging port, wherein the conveying device is configured to convey foodstuffs from the feeding port to the discharging port. The toaster includes a first heating device configured to heat the foodstuffs on the conveying device. The toaster includes a second heating device configured to preheat the foodstuffs within the feeding bin.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
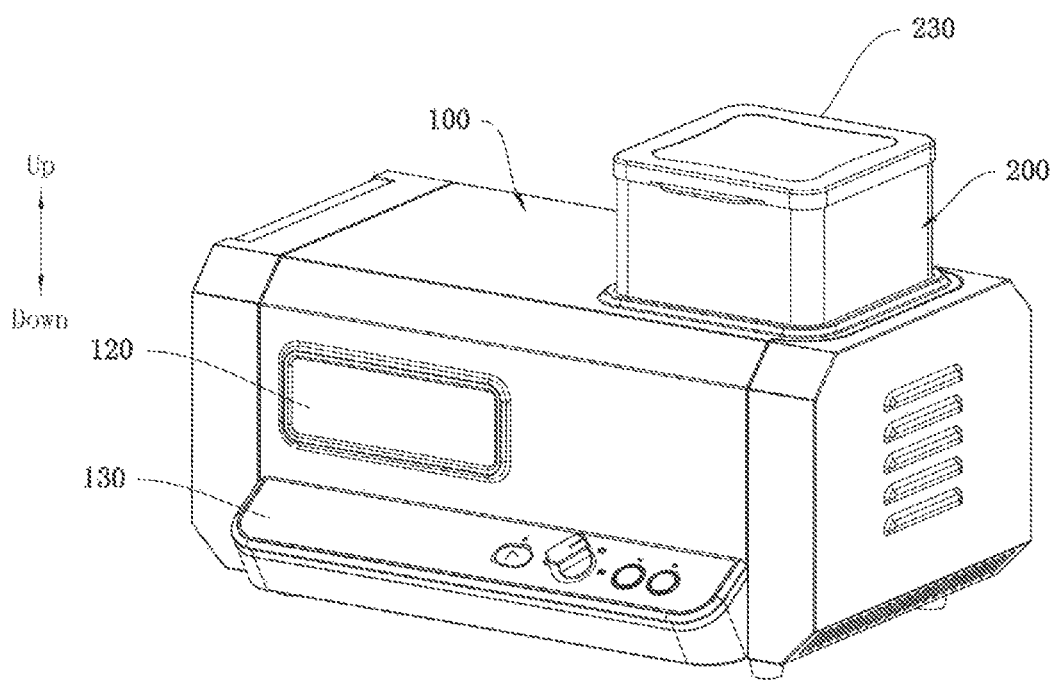
FIG. 1 is a schematic view of the three-dimensional structure of an exemplary embodiment of a toaster according to an embodiment of the present disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

The present disclosure aims to solve at least one of the technical problems in the existing technology. To this end, the present disclosure proposes a toaster requiring a short heating time.

A toaster according to embodiments of the present disclosure includes a box body, a feeding bin, a conveying device, a first heating device and a second heating device. A discharging port is provided on one side of box body. Feeding bin includes and/or is provided with a feeding end extending into box body; the feeding end is provided with a feeding port in communication with an inner cavity of the box body. A further end of feeding bin is provided with and/or includes a material inlet. A conveying device is arranged between feeding port and discharging port, and is configured to convey foodstuffs from the feeding port to the discharging port. First heating device is configured to heat foodstuffs on conveying device, and second heating device is configured to preheat the foodstuffs within feeding bin.

In operation, foodstuffs such as bread may be put into feeding bin through material inlet, second heating device may preheat the foodstuffs in the feeding bin; the foodstuffs may then fall into conveying device through the feeding port, and the conveying device may convey the foodstuffs to discharging port. During conveying process, first heating device may heat foodstuffs on conveying device until the foodstuffs are heated to a predetermined parameter, and then foodstuffs may be output from discharging port to the outside of box body for users to eat. Since foodstuffs are already preheated by second heating device in feeding bin, a temperature of the foodstuffs may have been raised before first heating device heats the foodstuffs. Moreover, as water content of foodstuffs may have been reduced, first heating device only needs to heat the foodstuffs for a relatively short period of time to achieve a preset toasting effect of the foodstuffs, which may greatly reduce heating time needed for the foodstuffs and/or may improve efficiency of toaster, reducing waiting time for users, and improving user experience.

According to some embodiments of the present disclosure, toaster may further include a blower device for delivering at least a portion of heat generated by second heating device to feeding port.

According to some embodiments of the present disclosure, blower device may be located below second heating device and may be arranged facing feeding port.

According to some embodiments of the present disclosure, second heating device may be located below conveying device and may be arranged facing feeding port.

According to some embodiments of the present disclosure, conveying device may include a first conveying device and a second conveying device. First conveying device may be located below feeding port. Second conveying device may be located between first conveying device and discharging port.

According to some embodiments of the present disclosure, first conveying device may include a first conveying mesh chain, a first conveying shaft and a first conveying motor. First conveying motor may be configured to drive first conveying mesh chain to rotate through first conveying shaft, such that the first conveying mesh chain is capable of conveying foodstuffs from feeding port to second conveying device.

According to some embodiments of the present disclosure, second conveying device may include a second conveying mesh chain, a second conveying shaft and a second conveying motor; the second conveying motor may be configured to drive the second conveying mesh chain to rotate through the second conveying shaft, such that the second conveying mesh chain is capable of conveying foodstuffs from first conveying device to discharging port.

According to some embodiments of the present disclosure, second heating device may include at least two heating tubes; the at least two heating tubes may be respectively located at upper and lower sides of a conveying surface of second conveying mesh chain.

According to some embodiments of the present disclosure, toaster may further include a heat insulator arranged between heating tubes and feeding bin.

According to some embodiments of the present disclosure, feeding bin may be further provided with a top cover removably covering material inlet.

Additional aspects and advantages of the present disclosure will be given in part in the following description and will become apparent in part from the following description or be learned by practice of the present disclosure.

Embodiments of the present disclosure will be described in detail below. Examples of the embodiments are illustrated in the accompanying drawings, where the same or like reference numerals throughout the figures indicate the same or like elements having the same or like functions. The embodiments described below with reference to the accompanying drawings are exemplary and are intended only to explain the present disclosure instead of being construed as limiting the present disclosure.

In the description of the present disclosure, it should be understood that, descriptions relating to orientation, for example, orientation or positional relationships indicated by "up", "down", "front", "back", "left", "right", etc. are based on the orientation or positional relationships shown in the accompanying drawings, and are to facilitate the description of the present disclosure and simplify the description only, rather than indicating or implying that the device or element referred to must have a specific orientation or be constructed and operated in a specific orientation, and therefore cannot be construed as limiting the present disclosure.

In the description of the present disclosure, the meaning of "several" is one or more, the meaning of "a plurality of" is two or more, "greater than", "less than", "more than", etc. are to be understood to exclude the given figure, and "above", "below", "within", etc. are understood to include the given figure. If "first" and "second", etc. are referred to, it is only for the purpose of distinguishing technical features, and shall not be understood as indicating or implying relative importance or implying the number of the indicated technical features or implying the sequence of the indicated technical features.

In the description of the present disclosure, unless otherwise explicitly defined, the words such as "set", "install", and "connect" should be understood in a broad sense, and those skilled in the art, having the benefit of the entirety of this disclosure, can determine the specific meanings of the above words in the present disclosure in a rational way in combination with the specific contents of the technical solutions.

Referring to FIGS. 1 to 4, a toaster according to an embodiment of the present disclosure includes a box body 100, a feeding bin 200, a conveying device, a first heating device 500, and a second heating device 600. Box body 100 may be substantially cuboid; the box body 100 may be formed in any alternative or additional shapes that may occur to a person skilled in the art upon reviewing the entirety of this disclosure. One side of box body 100 may be provided with a discharging port 110; in operation, foodstuffs may be heated and then discharged outside of the box body 100 through the discharging port 110. A side wall of box body 100 may also be provided with an observation window 120 through which a user can observe the internal condition of the box body 100. Box body 100 may also be provided with an operation panel 130 through which a user can control operation of toaster. Feeding bin 200 may be of a cylindrical structure. Feeding bin may be for storing bread or other foodstuffs to be heated. An opening may be provided in an upper end side wall or an outer peripheral side wall of box body 100, and feeding bin 200 may extend inside of the box body 100 through the opening. Feeding bin 200 may be provided at a feeding end with a feeding port 210 in communication with an inner cavity of box body 100, and a material inlet 220 at another end of the feeding bin 200. When using toaster, user may insert foodstuffs into feeding bin 200 through material inlet 220; during heating, the foodstuff may enter conveying device through feeding port 210. Conveying device may be arranged between feeding port 210 and discharging port 110, so that the conveying device can convey foodstuffs from the feeding port 210 to the discharging port 110. Conveying device may be a chain conveying mechanism, be a belt conveying mechanism, and of course, and/or any other type of conveying mechanisms. First heating device 500 may be configured to heat foodstuffs on conveying device, and may be of an electrical heating tube structure, a ceramic heating structure, and/or other types of heating structure. Second heating device 600 may be configured to preheat foodstuffs within feeding bin 200. Second heating device 600 may include any heating device suitable for use as first heating device 500, such as without limitation an electrical heating tube structure, a ceramic heating structure, and/or any other type of heating structure.

Figure 4:
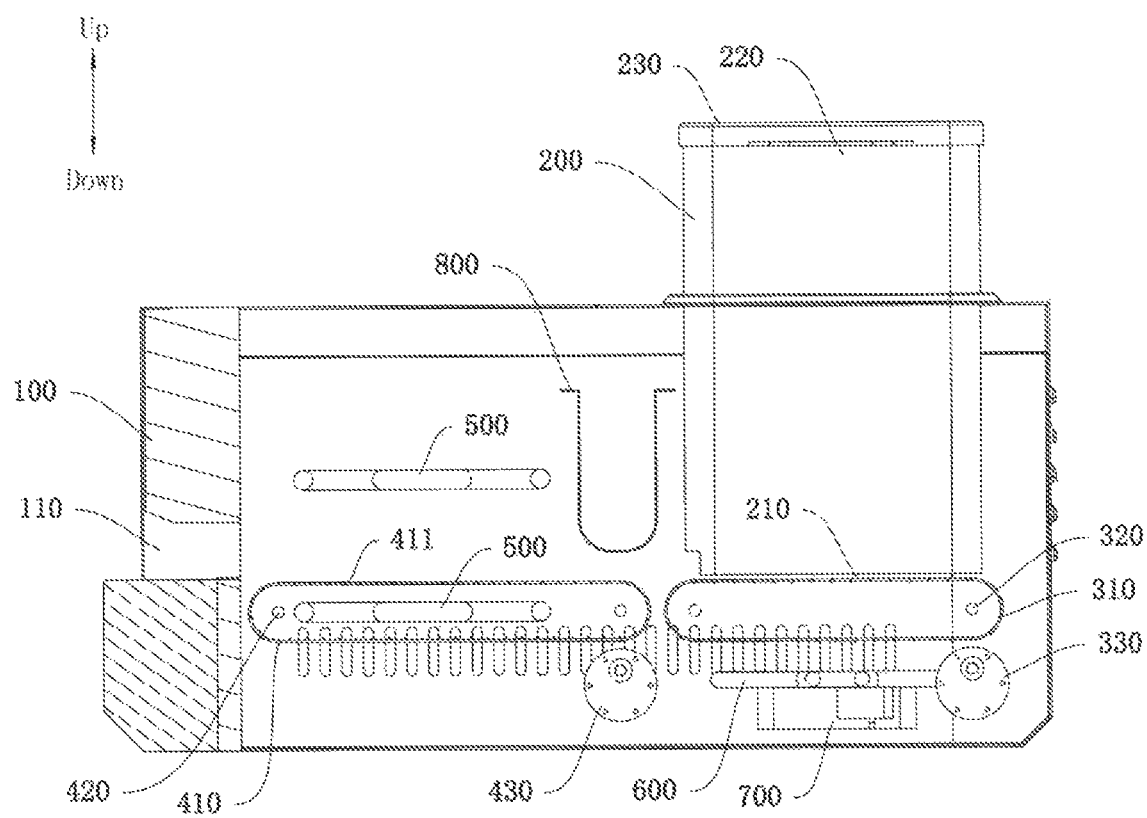
FIG. 4 is a schematic sectional view of FIG. 3 taken along line A-A as illustrated in FIG. 3.

Referring to FIG. 4 foodstuffs such as bread may be inserted into feeding bin 200 through material inlet 220. Second heating device 600 may preheat foodstuffs in feeding bin 200; subsequently the foodstuffs may fall into and/or onto conveying device through feeding port 210, and conveying device may convey the foodstuffs to discharging port 110. During conveying process, first heating device 500 may heat foodstuffs on conveying device until the foodstuffs are heated to a predetermined parameter, and then the foodstuffs may be output from discharging port 110 to an exterior of box body 100 for users to eat. Since foodstuffs are already preheated by second heating device 600 in feeding bin 200, a temperature of the foodstuffs may have been raised before first heating device 500 heats the foodstuffs. Moreover, as water content of the foodstuffs may have been reduced, first heating device 500 may only be required to heat the foodstuffs for a relatively short period of time to achieve a preset toasting effect of the foodstuffs; in an embodiment, this may greatly reduce heating time needed for the foodstuffs, improve toasting efficiency of toaster, reduce waiting time for users, and/or improves user experience.

Figure 2:
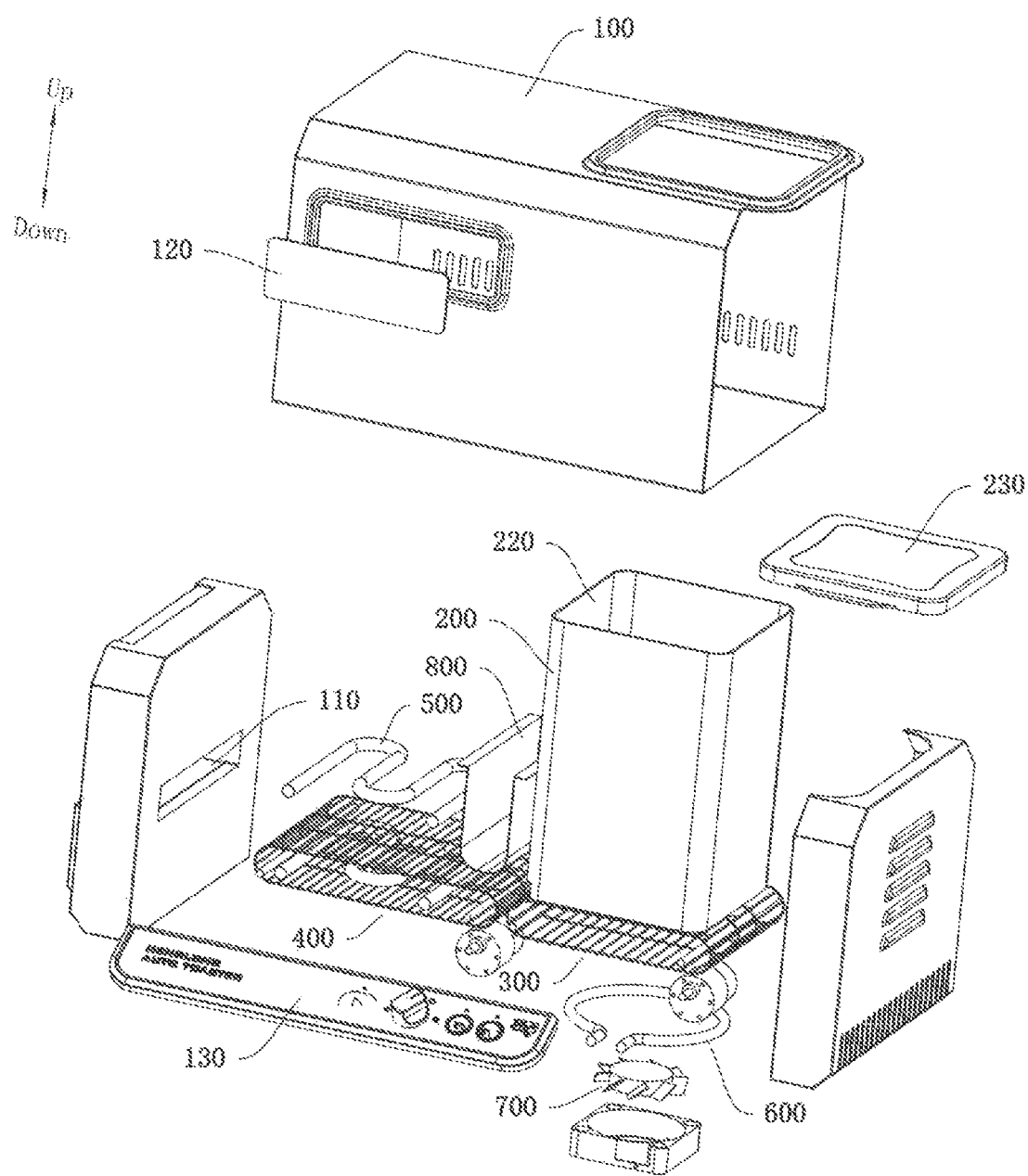
FIG. 2 is an exploded view of an exemplary embodiment of structure of a toaster according to an embodiment of the present disclosure.
Figure 3:
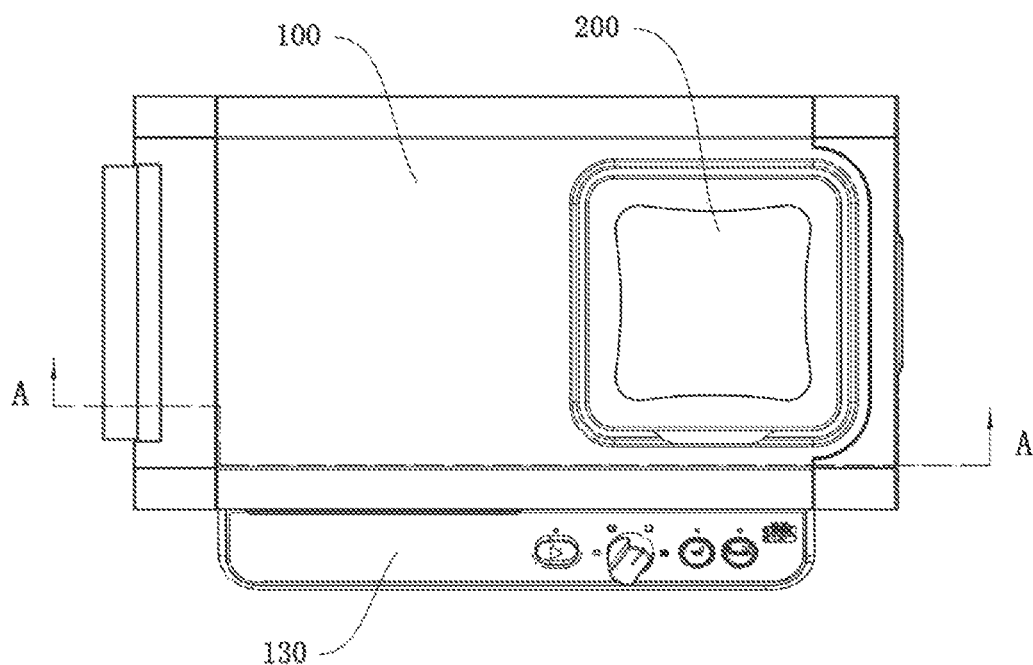
FIG. 3 is a schematic top view of an exemplary embodiment of a toaster according to an embodiment of the present disclosure.

Referring to FIGS. 2 and 4, in some embodiments of the present disclosure, toaster may further include a blower device 700 for delivering at least a portion of heat generated by second heating device 600 to feeding port 210. Blower device 700 may include a small fan including fan blades. Blower device 700 may alternatively or additionally include a bladeless fan. Blower device 700 may drive air to flow, thereby conveying at least a portion of heat generated by second heating device 600 to feeding port 210, and then the heat in turn may feeding bin 200, so that foodstuffs within the feeding bin 200 can be better preheated. By providing blower device 700, more heat generated by second heating device 600 may be able to enter inside feeding bin 200, thereby improving preheating of the foodstuffs. Moreover, blower device 700 may accelerate flow of air within feeding bin 200, thereby facilitating rapid reduction of water content of the foodstuffs.

Referring to FIG. 2, in the above embodiments, blower device 700 may be located below second heating device 600; therefore, air blown out from the blower device 700 may blow heat generated by the second heating device 600. Blower device 700 may be arranged facing feeding port 210, so that heat is blown toward the feeding port 210, and more heat can be conveyed into feeding bin 200, improving preheating effect.

In an embodiment, second heating device 600 may be located below conveying device, thereby preventing the second heating device 600 from affecting entry of foodstuffs into the conveying device from feeding port 210. Moreover, second heat device 600 may be arranged facing feeding port 210. Specifically, second heating device 600 may be located directly below feeding port 210, and blower device 700 may be located directly below the second heating device 600, in which case a distance between the second heating device 600 and the feeding port 210 may be smaller, thereby facilitating delivery by the blower device 700 of heat generated by the second heating device 600 to the inside of feeding bin 200 through the feeding port 210. Second heating device 600 may be arranged below feeding port 210; the second heating device 600 may be slightly offset from a position directly below according to actual installation requirements, but the present disclosure is not limited thereto.

Referring to FIG. 4, in some embodiments of the present disclosure, conveying device may include a first conveying device 300, which may be located below feeding port 210 and a second conveying device 400, which may be located between the first conveying device 300 and discharging port 110. After exiting from feeding port 210, foodstuffs first enters first conveying device 300, and may then be conveyed by the first conveying device 300 to second conveying device 400, and may be conveyed by the second conveying device 400 to discharging port 110. Second heating device 600 may be located below first conveying device 300. Since there are two conveying devices arranged on a path from feeding port 210 to discharging port 110, operating parameters may be set differently according to different preferences of users; for instance, the parameters such as conveying speed and conveying time of two conveying devices may be different from each other, so as to obtain different tastes of toasted foodstuffs as required by the users. When foodstuffs are located on first heating device 500, second heating device 600 may preheat the foodstuffs.

Referring to FIG. 4, in the above embodiments, first conveying device 300 may include a first conveying mesh chain 310, a first conveying shaft 320, and/or a first conveying motor 330. First conveying mesh chain 310 may be configured to carry foodstuffs. In particular, two first conveying shafts 320 may be provided. Two first conveying shafts 320 may be respectively located at two ends of first conveying mesh chain 310, and first conveying motor 330 may drive one of the first conveying shafts 320 to rotate. During operation, first conveying motor 330 may drive first conveying mesh chain 310 to rotate through first conveying shaft 320, so that the first conveying mesh chain 310 can convey foodstuffs from feeding port 210 to second conveying device 400; this may greatly enhance convenience of resulting conveyance.

Referring to FIG. 4, similarly, second conveying device 400 may include a second conveying mesh chain 410, a second conveying shaft 420, and/or a second conveying motor 430. Second conveying mesh chain 410 may be configured to carry foodstuffs. Two second conveying shafts 420 may be provided. Two second conveying shafts 420 may be respectively located at two ends of second conveying mesh chain 410, and second conveying motor 430 may drive one of the second conveying shafts 420 to rotate. During operation, second conveying motor 430 may drive second conveying mesh chain 410 to rotate through second conveying shaft 420, so that the second conveying mesh chain 410 can convey foodstuffs from first conveying device 300 to discharging port 110; this may greatly enhance convenience of resulting conveyance.

Referring to FIGS. 2 and 4, in some embodiments of the present disclosure, second heating device 600 may include at least two heating tubes, and the at least two heating tubes may be respectively located at upper and lower sides of conveying surface 411 of second conveying mesh chain 410, so that both upper and lower sides of foodstuffs passing through the second conveying mesh chain 410 can be fully heated, and a toasting effect of the foodstuffs may be greatly improved.

Referring to FIG. 2, in some embodiments of the present disclosure, toaster may further include a heat insulator 800 arranged between heating tubes and feeding bin 200. Since a temperature in a vicinity of heating tube may be relatively high and excessively high temperature may cause damage to a side wall of the feeding bin 200, a heat insulator 800 may be arranged between the heating tube and the feeding bin 200, so that the heat of the heating tube can be insulated by the heat insulator 800, thereby reducing the influence on the side wall of the feeding bin 200. Specifically, heat insulator 800 may include a U-shaped plate member that can effectively insulate heat generated by heating tube.

Referring to FIGS. 1 and 4, in some embodiments of the present disclosure, feeding bin 200 may also be provided with a top cover 230; the top cover 230 may removably cover material inlet 220. Top cover 230 may be configured to cover material inlet 220 to prevent dust or other impurities from falling into feeding bin 200 and contaminating foodstuffs in the feeding bin 200.

Although the embodiments of the present disclosure have been described in detail above with reference to the accompanying drawings, the present disclosure is not limited to the above embodiments, and various changes may be made within the knowledge of those of ordinary skill in the art without departing from the purpose of the present disclosure.

What is claimed is:

1. A toaster, the toaster comprising:
 a box body, wherein:
  the box body has an inner cavity; and
  the box body includes a discharging port on one side of the box body;

a feeding bin having a feeding end that extends into the box body, wherein:
the feeding bin further comprises a feeding port in communication with an inner cavity of the box body; and
the feeding bin includes a further end provided with a material inlet;
a conveying device arranged between the feeding port and the discharging port, wherein the conveying device is configured to convey foodstuffs from the feeding port to the discharging port;
a first heating device configured to heat the foodstuffs on the conveying device;
a second heating device configured to preheat the foodstuffs within the feeding bin; and
a blower device configured to deliver at least a portion of heat generated by the second heating device to the feeding port.

2. The toaster of claim 1, wherein the blower device is located below the second heating device.

3. The toaster of claim 2, wherein the blower device is arranged facing the feeding port.

4. The toaster of claim 2, wherein the second heating device is located below the conveying device.

5. The toaster of claim 2, wherein the second heating device is arranged facing the feeding port.

6. The toaster of claim 1, wherein the conveying device comprises a first conveying device located below the feeding port.

7. The toaster of claim 6 further comprising a second conveying device located between the first conveying device and the discharging port.

8. The toaster of claim 7, wherein the first conveying device comprises a first conveying mesh chain, a first conveying shaft and a first conveying motor.

9. The toaster of claim 8, wherein the first conveying motor is configured to drive the first conveying mesh chain to rotate through the first conveying shaft, such that the first conveying mesh chain is conveys the foodstuffs from the feeding port to the second conveying device.

10. The toaster of claim 7, wherein the second conveying device comprises a second conveying mesh chain, a second conveying shaft and a second conveying motor.

11. The toaster of claim 10, wherein the second conveying motor is configured to drive the second conveying mesh chain to rotate through the second conveying shaft, such that the second conveying mesh conveys the foodstuffs from the first conveying device to the discharging port.

12. The toaster of claim 10, wherein the second heating device comprises at least two heating tubes.

13. The toaster of claim 12, wherein the at least two heating tubes are respectively located at upper and lower sides of a conveying surface of the second conveying mesh chain.

14. The toaster of claim 1, wherein the second heating device comprises at least two heating tubes.

15. The toaster of claim 13, further comprising a heat insulator arranged between the heating tubes and the feeding bin.

16. The toaster of claim 1, wherein the feeding bin further comprises a top cover removably covering the material inlet.

* * * * *